J. W. STACHNICK.
AUTOMATIC AUTOMOBILE REAR SIGNAL.
APPLICATION FILED JUNE 12, 1913.

1,106,982.

Patented Aug. 11, 1914.
2 SHEETS—SHEET 1.

Witnesses
Inventor
J. W. Stachnick.

J. W. STACHNICK.
AUTOMATIC AUTOMOBILE REAR SIGNAL.
APPLICATION FILED JUNE 12, 1913.

1,106,982.

Patented Aug. 11, 1914.
2 SHEETS—SHEET 2.

Witnesses

Inventor
J. W. Stachnick.

By
Attorney

UNITED STATES PATENT OFFICE.

JOHN WM. STACHNICK, OF BALTIMORE, MARYLAND

AUTOMATIC AUTOMOBILE REAR SIGNAL.

1,106,982.  Specification of Letters Patent.  Patented Aug. 11, 1914.

Application filed June 12, 1913. Serial No. 773,303.

*To all whom it may concern:*

Be it known that I, JOHN WILLIAM STACHNICK, a citizen of the United States, residing at Baltimore, in the State of Maryland, have invented certain new and useful Improvements in Automatic Automobile Rear Signals; and I do hereby declare the following to be a full, clear, and exact description of the invention, such as will enable others skilled in the art to which it appertains to make and use the same.

This invention relates to new and useful improvements in automatic signaling devices for automobiles and has particular reference to that type of such devices known as direction indicators.

There have heretofore been invented a number of direction indicating signals for automobiles, but in almost every instance it is necessary to manually operate the signals when the driver makes a turn, and automobile owners have, therefore, almost universally adopted the system of throwing out an arm to the left or right when contemplating a turn, finding this method more convenient than manually operating a direction indicating signal. This system is open to objection, however, in that a driver sitting on the right hand side of a car can not conveniently project his left arm, not being on the left side of the car, since the distance is too great to permit such a move unless the driver leaves his seat.

It is, therefore, the principal object of this invention to provide an automatic direction indicating signal, which will in day time, by a semaphore arm, or at night by a light, indicate to the driver of an oncoming vehicle the direction that the driver of the signal carrying vehicle indicates.

It is a further object of this invention to provide electrical means for operating the signals and to provide a novel form of switch arranged beneath the floor of the car for coöperation with a switch arm carried by the steering column, so that the act of turning the steering column during the taking of a turn will automatically close the circuit through the signal indicating the direction of the turn.

The above and additional objects are accomplished by such means as are illustrated in the accompanying drawings, described in the following specification and then more particularly pointed out in the claim which is appended hereto and forms a part of this application.

Figure 1:
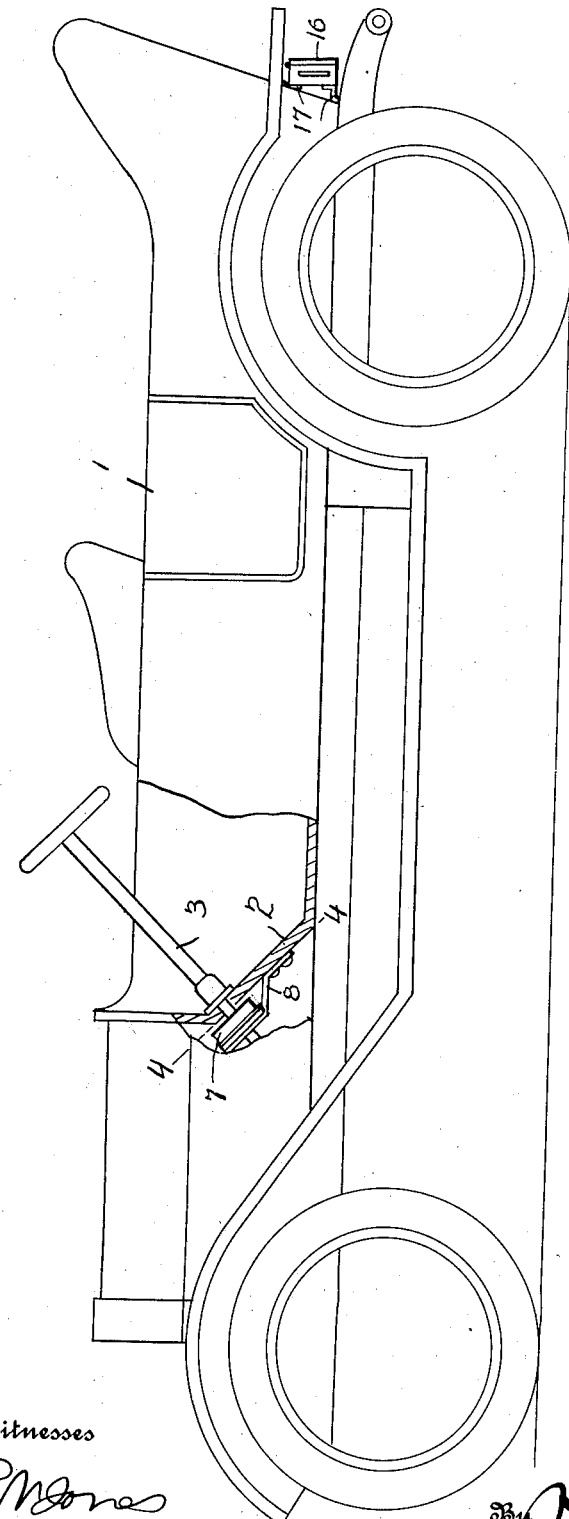
Figure 6:
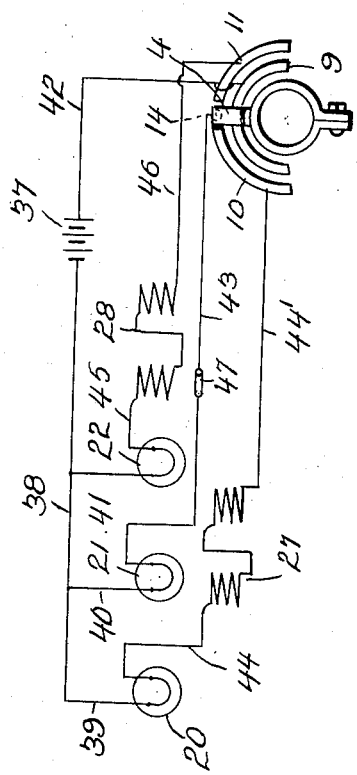
Figure 2:
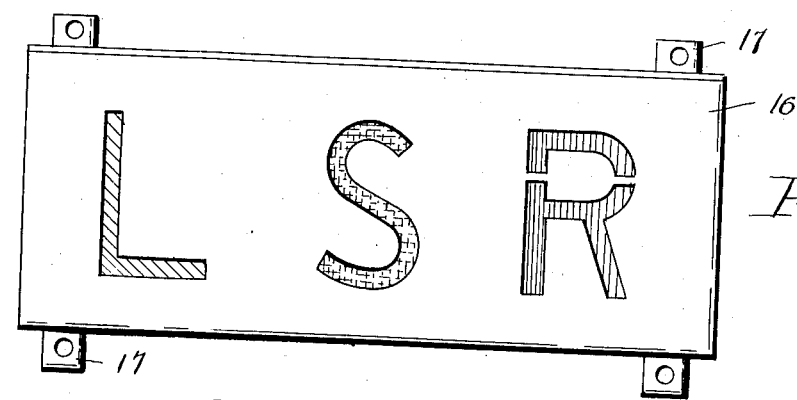
Figure 3:
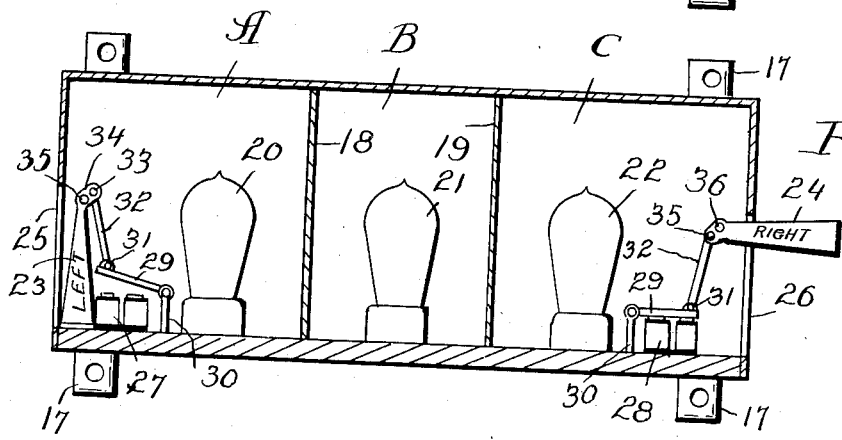
Figure 4:
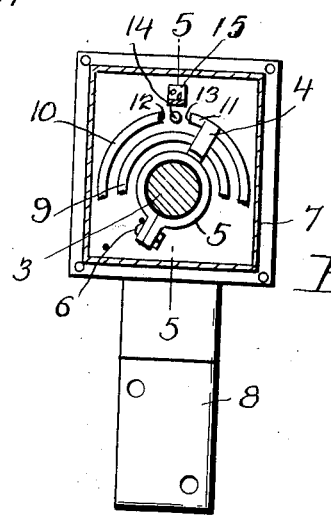
Figure 5:
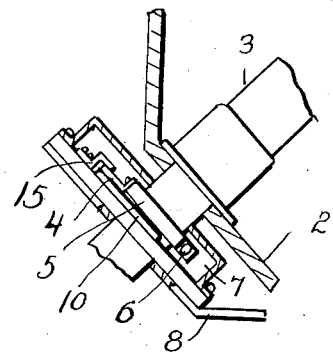

With reference to the drawings, wherein I have illustrated the preferred embodiment of my invention as it is reduced to practice, and throughout the several views of which similar reference numerals designate corresponding parts: Figure 1 is a side elevation of an automobile equipped with the present invention, illustrating portions of the automobile body broken away to more clearly disclose the disassembled relation of the various parts; Fig. 2 is a detail view and front elevation of the signal housing or casing which is in practice attached to the rear end of the body of the automobile; Fig. 3 is a vertical longitudinal section of the housing, illustrating the interior mechanism which includes the signal lamps, the semaphore arms, and the electrical magnets for operating the latter; Fig. 4 is a section on the line 4—4 of Fig. 1; Fig. 5 is a section on the line 5—5 of Fig. 4; Fig. 6 is a diagrammatic view of the wiring system.

Proceeding now to the description of the drawings, the numeral 1 designates as an entirety the automobile body, in which the slanting portion of the floor, through which the clutch and brake pedals operate in the usual manner, is designated by the numeral 2. A steering column 3 of any preferred type operates through the slanting floor board 2 in the usual manner, and carries immediately below the floor board 2 a switch arm 4, which is designed to rotate in fixed relation to the steering column 3, and is secured thereto by a gripping collar 5, clamped in adjusted position on the member 3 by a bolt 6. The members 4 and 5 are arranged interiorly of a substantially rectangular metallic casing 7, which is attached to the under face of the floor board 2 by a bracket 8. Interiorly of the box 7, and insulated therefrom, are three contact rings 9, 10 and 11. The member 9 is substantially semi-circular and is mounted for contact at all times with the switch arm 4. The members 10 and 11 are quadrantal in shape, but when in assembled position present the appearance of a semi-circular ring. The terminals 12 and 13 of the members 10 and 11, respectively, are spaced from each other, as will be observed by particular reference to Fig. 4. In the space thus formed, and centrally thereof, is arranged a contact pin 14, the function of which will be hereinafter disclosed.

An angular metallic strap 15 is secured to the bottom wall of the casing 7, and is designed to hold the free end of the member 4 in contact with the pin 14 while the vehicle is moving straight ahead. A description of the manner in which the circuits through the various signals are closed by the rotation of the steering column will be hereinafter presented.

The various signaling elements of this invention are arranged interiorly of the signal housing or casing 16, which is bolted or otherwise secured by the apertured ears 17 to the rear of the automobile body. The casing 16 is substantially rectangular in shape in the preferred embodiment, although any other desired conformation may, of course, be used.

The housing is divided into three compartments, and a pair of vertical partition walls 18 and 19. In the compartments A, B and C, thus formed, are respectively arranged the signal lamps 20, 21 and 22. The front wall of the casing is cut out to produce the three letters L, S and R, as illustrated in Fig. 2. These letters register respectively with the compartments A, B and C. Behind each of these letters is arranged a colored glass, the purpose of which will be obvious. It has been found desirable in practice to equip the letters L, S and R, respectively, with green, yellow and red glass plates.

The letter L indicates a left turn, the letter S straight ahead, and the letter R a right hand turn. The lamp 21 of the letter S is normally in circuit at night, while the circuit through the lamps 20 and 22 of the letters L and R are normally open, but are automatically closed by the turning of the steering column, as will be hereinafter described.

It is, of course, obvious that in day time the lamps 20, 21 and 22 will lose their effectiveness and there has, therefore, been provided a pair of semaphorical direction indicating arms 23 and 24, which are formed of sheet metal or any other desired material and are normally disposed interiorly of the casing, being adapted, however, to be projected therefrom through slots 25 and 26, and to assume a horizontal position when actuated in the manner to be next described. The members 23 and 24 may be of any desired color and carry the printed words "Left" and "Right", as will be observed by reference to Fig. 3.

A pair of electro-magnets are positioned on the bottom wall of the casing 16 for the operation of the members 23 and 24. In the drawings the magnets for the member 23 are designated by the numeral 27, while the magnets for the member 24 are designated by the numeral 28. As a means for swinging the members 23 and 24 into horizontal position upon the energization of the magnets 27 and 28, there has been provided for each semaphore arm an armature plate 29, which is pivoted at one terminal to a vertical standard 30, and is pivotally connected at its other terminal, as at 31, to a link 32, which is in turn pivotally connected at its upper terminal, as at 33, to the sub-arm 34 of the semaphore arm. It will be observed that each semaphore is pivoted adjacent its rear terminal, as at 35 and 36. When either magnet 27 or 28 is energized, the armature plate 29, which is of soft iron or any other suitable material, is drawn down with the consequent downward movement of the link 32 and short arm 34 and resultant upward movement of the semaphore.

The actual construction and arrangement of the several parts of this invention being thus disclosed, the preferred form of wiring system is taken up as next in order. Reference will now be had particularly to Fig. 6. The positive pole of the battery 37 is connected to the lamps 20, 21, and 22, respectively, by a wire 38 and the lead wires 39, 40 and 41. The negative pole of the battery is connected by a wire 42 to the contact ring 9. The circuit through the center lamp 21, which is normally in circuit, is closed by a wire 43 which is connected to the pin 14 of the automatic switch. It will be apparent that the circuit between the contact pin 14 and the contact ring 9 is normally closed by the switch arm 4 as long as the automobile is moving straight ahead. However, in the event that a left turn is made by the operator of the machine, the rotation of the steering column will disengage the switch arm 4 with the pin 14 and will bring it into contact with the ring 10, which is connected by a wire 44 to the magnets 27, which are, in turn, connected by a wire 44' to the lamp 20. It will, therefore, be apparent that when the driver makes a left turn, the circuit in the battery 37 will flow through the wires 38 and 39, through the lamp 20, through the wire 40, into the magnet 27, and from the magnet 27 through the wire 44, through the ring 10; from the ring 10, through the switch arm 4, and back to the battery through the contact ring 9 and wire 42. It is, therefore, apparent that when a left turn is made, the light behind the letter L is illuminated and the semaphore arm is turned into horizontal position. The driver of an oncoming vehicle will, therefore, be warned of the left turn by the illuminated L at night, and by the semaphore arm 23 in the day time. The operation of the various parts in displaying the right turn signals is similar to the operation above described of the left turn signals. The circuit for the right turn signals is effected through a wire 45, through the magnets 28, through a wire 46 to the contact ring 11, and thence through the switch arm 4, contact ring 9, and wire 42.

A switch 47 may be interposed in the wire 43 and attached to the dash-board of the automobile within reach of the driver, so that during the day the circuit may be broken through the lamp 21. In this event no signal will be displayed and no current used from the batteries, except during the making of turns. The switch is also used when the machine is put in the garage to prevent the waste of the current from the batteries.

In reduction to practice, I have found that the form of my invention, illustrated in the drawings and referred to in the above description, as the preferred embodiment, is the most efficient and practical; yet, realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

What is claimed is:

In a device of the character described, the combination with an automobile and the steering column thereof of a rectangular housing mounted upon said automobile and having longitudinal slots formed in its end walls, a plurality of electric lamps mounted within said housing, a pair of semaphore arms pivotally mounted within said housing and adapted to operate through the slots therein, an electromagnet mounted within said housing adjacent each of the semaphore arms, a vertical standard mounted within said housing adjacent each of the magnets, an armature pivotally mounted upon each of said standards above said magnets and a link connecting each of said pivoted armatures with the semaphore arms and means for operating said semaphore arms and the electric lamps mounted upon said steering column.

In testimony whereof I affix my signature in presence of two witnesses.

JOHN WM. STACHNICK.

Witnesses:
CHRISTIAN W. SEITZ,
JOHN O'DONNELL.